US012704431B2

(12) United States Patent
Nakagawa et al.

(10) Patent No.: US 12,704,431 B2
(45) Date of Patent: Aug. 11, 2026

(54) APPARATUS AND METHOD FOR LEAK TEST

(71) Applicants: Marunaka Co., Ltd., Aichi (JP); TOYOTA JIDOSHA KABUSHIKI KAISHA, Aichi-ken (JP)

(72) Inventors: Mitsugu Nakagawa, Aichi (JP); Kyojiro Inoue, Toyota (JP)

(73) Assignees: Marunaka Co., Ltd., Aichi (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 511 days.

(21) Appl. No.: 18/153,372

(22) Filed: Jan. 12, 2023

(65) Prior Publication Data

US 2023/0221204 A1 Jul. 13, 2023

(30) Foreign Application Priority Data

Jan. 12, 2022 (JP) ................................. 2022-003243

(51) Int. Cl.
*G01M 3/20* (2006.01)

(52) U.S. Cl.
CPC ..................................... *G01M 3/20* (2013.01)

(58) Field of Classification Search
CPC .......... G01M 3/20; G01M 3/229; G01M 3/04; G01M 3/202
See application file for complete search history.

(56) References Cited

FOREIGN PATENT DOCUMENTS

| | | | |
|---|---|---|---|
| CN | 102047090 | | 5/2011 |
| CN | 103069261 | | 4/2013 |
| JP | S63256833 | | 10/1988 |
| JP | H0618355 | | 1/1994 |
| JP | H10227712 | | 8/1998 |
| JP | H10300626 | | 11/1998 |
| JP | 2004340844 | | 12/2004 |
| JP | 6235687 | | 11/2017 |
| JP | 2018194415 | A * | 12/2018 |
| WO | 2009157092 | | 12/2009 |
| WO | 2012005199 | | 1/2012 |

OTHER PUBLICATIONS

English Machine Translation of JP 2018-194415 A, translated online May 2025 (Year: 2018).*
"First Office Action Notification of China Counterpart Application", with English translation thereof, issued on Mar. 2, 2026, pp. 1-30.

* cited by examiner

*Primary Examiner* — David Z Huang
(74) *Attorney, Agent, or Firm* — JCIPRNET

(57) ABSTRACT

An apparatus for leak test is provided with: a gas dissolution portion having function to degasify a unused liquid; a liquid filling and circulation portion for filling the gas dissolved liquid in the test piece; a high-pressure application portion for pressurizing the filled gas dissolved liquid; a leak test portion for detecting the gas in the liquid vapor leaking out in the vacuum container from leak hole(s) of the test piece resulting from high-pressure application; and a liquid collection portion for collecting the gas dissolved liquid as relieving high pressure. The leak test process under high pressure is conducted in the closed circulated flow path. The leak test process uses the liquid easy for gas to be dissolved and to flow through the leak hole(s). Further, the leak test process uses the gas easy to dissolve in the liquid or to be detected.

13 Claims, 12 Drawing Sheets

LEAK TEST PROCESSES BY APPARATUS 300 FOR LEAK TEST (a)

L.D.M.
15
D.M.T.
15b
13
FIRST VACUUM PUMP
VG3
VG2
V.EX.
PISTON ROD
15a1
CYLINDER
15a
VG1
14
V.EX.
VL2
V10
1ATM
F.P.T.
V.EX.
L.T.
11
U.L.
VL1
VG4
17
D.T.
12
F.L.T.P.
LIQUID
LIQUID
VL6
VL3
VL4
C.P.
VG5
15c (b)

APPARATUS AND METHOD FOR LEAK TEST

CROSS REFERENCE TO RELATED APPLICATIONS

The present invention claims priority under 35 U.S.C. § 119 to Japanese Application No. 2022-003243 filed on Jan. 12, 2022 the entire content of which is incorporated herein by reference.

FIELD OF THE INVENTION

This invention relates to an apparatus and method for leak test which allows for conducting a leak test using a gas dissolved liquid as a trace fluid under a high-pressure condition of equal to or more than 1 MPa, safely, at low cost and efficiently.

BACKGROUND OF THE INVENTION

There are used many methods for leak test such as a bubble forming method, an underwater bubble flowing method, a chemical marker method, an ultrasonic method, a differential pressure method, or vacuum chamber method and the like, in order to detect a leak resulting from a defect in a structural body of various types of a consumer component, industrial component or container and the like or a defect in a welded joint or sealed part. A gas is often used as a trace fluid in the aforementioned methods for leak test. Therefore, in case that a leak test is conducted under a high-pressure condition, a test piece may have a danger of occurring a huge burst due to a high-pressure gas filled in the interior of the test piece. Therefore, the test piece and test apparatuses need to be put in a protection chamber and some safety measures are needed such as an unmanned operation and the like during gaseous pressurization process.

On the other hand, an apparatus and method for leak test is disclosed where a liquid as a trace fluid is used (See the first patent document described below, for example.). When conducting the leak test using a liquid as trace fluid under a high-pressure condition of equal to or more than 1 MPa, there are not needed any protection chambers and unmanned operations so that it is safer compared to a leak test with a gaseous pressurization. Moreover, the leak test using the liquid as trace fluid also has a merit of being carried out at lower cost because a liquid pressurization is easier than a gaseous pressurization.

On the other hand, another apparatus and method for leak test is disclosed where a helium gas is dissolved or mixed in such a liquid as water to become a helium dissolved liquid to be filled in the test piece and the helium gas in the liquid leaking out from the test piece to a vacuum space is to be detected by a helium gas detection means, as called "helium leakage detector" (See the second and third patent documents described below, for example.). These apparatuses and methods make use of an advantage that a leakage method using helium gas as a trace gas has a very high sensitivity and permits continuous use.

A leak test conducted under a high-pressure condition of equal to or more than 1 MPa is also disclosed where a gas dissolved liquid as a trace fluid is used (See the first patent document described below, for example.). This prior art discloses carbon dioxide ($CO_2$), hydrogen peroxide solution ($H_2O_2$), ammonia ($NH_3$) and the like as the gas to be easily dissolved in the liquid.

A prior art is also disclosed where a test piece is an air tight container which is soaked in perfluorinated liquid where a perfluorinated gas is dissolved, and pressurized under the pressure of less than 1 MPa, to be infiltrated in the test piece through leak hole(s) of the test piece. And then the test piece is placed in an inspection chamber of leak detection means whose pressure is set to be lower than the pressure of the interior of the test piece and the infiltrating perfluorinated liquid escapes from the leak hole of the test piece to be detected (this leak test method is called as "a soaking method"). Another method is disclosed where, as a trace fluid, it is possible to make the soaking time shorter by utilization that a liquid is higher than a gas in density under a low pressure of less than 1 MPa (See the fourth patent document, for example.).

PRIOR ART DOCUMENTS

Patent Documents

[FIRST PATENT DOCUMENT] WO2012/005199
[SECOND PATENT DOCUMENT] JPS63-256833
[THIRD PATENT DOCUMENT] JPH10-227712
[FOURTH PATENT DOCUMENT] JPH6-18355

In the apparatus for leak test using a high pressurized liquid as a trace fluid, disclosed in the aforementioned first patent document, the interior of the test chamber accommodating the test piece must be put into high vacuum condition such as less than 0.1 Pa and consequently, the apparatus for leak test has a problem that a waiting time becomes long in case of a large test piece. Moreover, the high-pressurized liquid is to leak out from the leak hole to a vacuum and change a liquid vapor, to be detected. However, when a quadrupole mass analyzer is used as a gas detector in order to detect the liquid vapor, the apparatus for leak test has such a durability problem that the pollution of the liquid vapor results in causing the sensitivity of the quadrupole mass analyzer to be changed.

On the other hand, some configurations of leak tests for the purpose of adapting to various kinds of test pieces are disclosed in the aforementioned second patent document relating to the method for leak test using a gas solution as a trace fluid. However, any embodiments of the configurations are not disclosed at all in second patent document. That is, any information is not disclosed at all regarding means to control the dissolved gas concentration to be constant and high or regarding liquids enabling the gas to be dissolved with a high concentration.

Also, the method for leak test using a gas dissolved liquid as a trace fluid, described in the aforementioned third patent document, relates to a leak test for a pipe which has inlet and outlet which is placed into a vacuum container, wherein a helium gas mixed water including helium fine babbles continuously is flown from the inlet of the pipe and discharged from the outlet thereof, thereby enabling to supply a given constant concentration of helium-bubbles mixed water into the pipe to be tested to detect the helium gas leaking from leak hole(s) of the pipe to the vacuum container. This method for leak test must continuously flow the helium-bubbles mixed water in order to keep the concentration of helium-babbles constant and consequently, have a difficulty in applying to arbitrarily shaped parts or vessels. Especially, it is impossible to apply this method for leak test to a leak test using a high pressurized liquid because a test piece is pressurized under closed condition after filled with a liquid.

In the method for leak test using gas dissolved liquid under high pressurization of equal to or more than 1 MPa, described in the first patent document, any information is not disclosed at all regarding means to control the concentration of the dissolved gas to be constant and high or regarding liquids enabling the gas to be dissolved with a high concentration, as well.

The method for leak test, described in the second patent document, does not have any objects to apply a high pressurization of equal to or more than 1 MPa, even though it uses as a trace fluid a perfluorinated liquid where a perfluorinated gas is dissolved in a liquid. Therefore, the second patent document does not disclose any information regarding means or methods using a gas dissolved liquid of high pressurization.

In the quantity production, the achievement of a high-pressurized leak test using as a trace fluid a gas dissolved liquid, generally, necessitates the preparation of a predetermined constant concentration of the gas dissolved liquid in every leak test of a few minutes to about ten minutes. To this end, it is necessary to improve each of means of producing the trace fluid, filling the trace fluid in the test piece, pressurizing the trace fluid filled test piece, and collecting the trace fluid, respectively. It should be noted that the liquid includes impure substances such as air intrinsically dissolved therein and then, when the liquid, as it is, is used to be filled in the test piece whose interior is under vacuum condition, there will concernedly occur an erroneous determination at the leak test, if impure air is gasified to residue at leak hole(s). This has to be avoided.

SUMMARY OF THE INVENTION

The present invention has been made in view of the aforementioned problems of the prior arts. Hence, the invention provides an apparatus and method for leak test which allows for conducting a leak test using a gas dissolved liquid as a trace fluid under a high-pressure condition of equal to or more than 1 MPa, safely, at low cost and efficiently.

In order to solve the aforementioned problems, a method for leak test according to the present invention uses as a trace fluid a gas dissolved liquid to conduct a leak test of a test piece (TP), wherein the test piece (TP) is placed in a middle of a closed circulated flow path which goes out from a dissolution tank (12) where the gas is dissolved at a given constant concentration, to return back to the dissolution tank (12); and the trace fluid is flown along the closed circulated flow path to be filled in the test piece (TP).

A second feature of a method for leak test according to the present invention is that the trace fluid is processed a degasification process of removing other gases except said gas before being filled in the test piece (TP).

A third feature of a method for leak test is that the test piece (TP) is placed in the interior of a vacuum container (41) whose interior can be under vacuum condition.

A fourth feature of a method for leak test according to the present invention is that the interior of the test piece (TP) is put under vacuum condition in advance before being filled with the trace fluid.

A fifth feature of a method for leak test according to the present invention is that, before being filled with the trace fluid, the interior of the test piece (TP) is previously put under non-vacuum condition equal to or less than a gas dissolution pressure which allows the gas to be dissolved in the liquid.

A sixth feature of a method for leak test according to the present invention is that the test piece (TP) filled with the trace fluid is configured to be vibrated, kept still or repressurized by the gas.

A seventh feature of a method for leak test according to the present invention is that the trace fluid is configured to be return back to a collection tank (51) until a given time has passed since the trace fluid got started to be filled in the test piece (TP).

An eighth feature of a method for leak test according to the present invention is that the trace fluid is, after the given time passed, configured to be filled in the interior of the test piece (TP) by being made passed and circulated through the interior of the test piece (TP).

A ninth feature of a method for leak test according to the present invention is that the test piece (TP) is, before being filled with the trace fluid, configured to be previously filled with the liquid completed the degasification process.

A tenth feature of a method for leak test according to the present invention is that a filling line system (L24, L45) for filling the trace fluid in the test piece (TP) is configured to be independent of a pressurizing line system (L14) for pressurizing the filled trace fluid.

An eleventh feature of a method for leak test according to the present invention is that a headspace over a liquid level of the liquid is drawn a vacuum while the liquid stored in a tank (12, 51) is circulated so that a part of the liquid in the tank (12, 51) is transferred to a container (15*b*) being under vacuum condition, to determine whether or not the degasification process is completed on the basis of a height (h) of the liquid level of the liquid.

A twelfth feature of a method for leak test according to the present invention is that a headspace over a liquid level of the liquid is drawn a vacuum while the liquid stored in a tank (12, 51) is circulated so that the tank (12, 51) is communicated with a container (15*a*) storing the liquid completed the degasification process, to determine whether or not the degasification process is completed on the basis of a difference (Δh) of liquid levels between the container (15*a*) and the tank (12, 51).

A thirteenth feature of a method for leak test according to the present invention is that a validation of the leak test is assured on the basis of: a master leak (46) to be capable of making a predetermined leak quantity of the gas in the trace fluid under a given pressurization; a first gas detection means (45) to detect the leak quantity of the gas leaking out from the master leak (46); and a second gas detection means (22) to detect a concentration of the gas contained in the trace fluid flowing downstream of the master leak (46) in the closed circulated flow path.

A fourteenth feature of a method for leak test according to the present invention is that the liquid is satisfied with a following expression:

[(density of the liquid)×(solubility of the gas to the liquid)]/[(viscosity coefficient of the liquid)×(molecular weight of the liquid)]>(a given coefficient with respect to the gas)×[(density of the water)×(solubility of the gas to the water)]/[(viscosity coefficient of the water)×(molecular weight of the water)].

A fifteenth feature of a method for leak test according to the present invention is that the gas is carbon dioxide ($CO_2$) or inert gases including helium and argon belonging to the $18^{th}$ group element.

In order to solve the aforementioned problems, an apparatus for leak test according to the present invention, comprises: a gas dissolution means (1) for manufacturing a liquid where a gas is dissolved at a constant concentration; a liquid filling and circulation means (2) for filling as trace fluid the liquid in a test piece (TP); a high pressure application means (3) for pressurizing the liquid filled in the test piece (TP); a leak test means (4) for detecting a leak quantity of the gas leaking out through the test piece (TP) due to being pressurized; a liquid collection means (5) for collecting the liquid filled in the test piece (TP) and return the liquid back to the gas dissolution means (1); a supply pipe line (L14) for communicating the gas dissolution means (1) with the leak test means (4); a collection pipe line (L45) for communicating the leak test means (4) with the liquid collection means (5), wherein a line system for the liquid to flow is configured to be a closed circulated flow path which goes out from the gas dissolution means (1) to return back to the gas dissolution means (1) again.

A second feature of an apparatus for leak test according to the present invention is that the gas dissolution means (1) includes a degasification means (12, 13, 14, 15, 15', 17) for previously removing impure gases other than the gas dissolved in the liquid.

A third feature of an apparatus for leak test according to the present invention is that the leak test means (4) includes: a vacuum container (41) for accommodating the test piece (TP); a vacuum pump (43) for drawing the test piece (TP) into a vacuum condition; and a gas detection means (45) for detecting a leak quantity of the gas leaking out from the test piece (TP).

A fourth feature of an apparatus for leak test according to the present invention is that the leak test means (4) includes a discharge valve (42) for communicating an interior of the test piece (TP) with an interior of the vacuum container (41).

A fifth feature of an apparatus for leak test according to the present invention is that the supply pipe line (L14) has a gas pipe line (L16) for flowing the gas connected thereto.

A sixth feature of an apparatus for leak test according to the present invention is that the leak test means (4) includes a vibration means for vibrating the test piece (TP) filled with the trace fluid.

A seventh feature of an apparatus for leak test according to the present invention is that a gas detection means (22) for detecting a concentration of the gas contained in the trace fluid is disposed between the leak test means (4) and the gas collection means (5).

An eighth feature of an apparatus for leak test according to the present invention is that the collection pipe line (L45) includes a bypass pipe line (L41) connecting to the gas dissolution means (1).

A ninth feature of an apparatus for leak test according to the present invention is that the collection pipe line (L45) includes a second supply pipe line (L54) connecting to the supply pipe line (L14).

A tenth feature of an apparatus for leak test according to the present invention is that the test piece (TP) has, in a mouth portion, a fastener cap (47') comprised of: a movable sleeve (47*b*) disposed coaxially and slidably with the supply pipe line (L14); a port (TP1) forming a clearance between the supply pipe line (L14) and having the supply pipe line (L14) to be inserted coaxially thereto; and a cap main body (47*a*) having the port (TP1) to be connected coaxially thereto and having a three-way flow path.

An eleventh feature of an apparatus for leak test according to the present invention is that the gas dissolution means (1) and the liquid collection means (5) have: a tank (12, 51) for storing the liquid; a pump (17, 54) for circulating the liquid in the tank (12, 51); a vacuum pump (13, 52') for drawing a headspace over a liquid level of the liquid in the tank (12, 51) into a vacuum; a container (15*b*) to be under vacuum condition; and a transfer means (15*a*) for transferring the liquid in the tank (12, 51) to the container (15*b*).

A twelfth feature of an apparatus for leak test according to the present invention is that the gas dissolution means (1) and the liquid collection (5) have: a tank (12, 51) for storing the liquid; a pump (17, 54) for circulating the liquid in the tank (12, 51); a vacuum pump (13, 52') for drawing a headspace over a liquid level of the liquid in the tank (12, 51) into a vacuum; a container (15*a*) for storing the liquid completed the degasification process; and a communication means (VL1) for communicating the tank (12, 51) with the container (15*a*).

A thirteenth feature of an apparatus for leak test according to the present invention is that the leak test means (4) includes: a master leak (46) capable of making a predetermined leak quantity of the gas in the trace fluid under a given pressurization; and a first gas detection means (45) to detect the leak quantity of the gas leaking out from the master leak (46); and the liquid filling and circulation means (2) includes: a second gas detection means (22) to detect a concentration of the gas contained in the trace fluid flowing downstream of the master leak (46) in the closed circulated flow path.

A fourteenth feature of an apparatus for leak test according to the present invention is that the liquid is satisfied with a following expression:

[(density of the liquid)×(solubility of the gas to the liquid)]/[(viscosity coefficient of the liquid)×(molecular weight of the liquid)]>(a given coefficient with respect to the gas)×[(density of the water)×(solubility of the gas to the water)]/[(viscosity coefficient of the water)×(molecular weight of the water)].

A fifteenth feature of an apparatus for leak test according to the present invention is that the gas is carbon dioxide ($CO_2$) or inert gases including helium and argon belonging to the $18^{th}$ group element.

Effects of the Invention

A method for leak test according to the present invention allows for conducting a leak test using a gas dissolved liquid as a trace fluid under a high-pressure condition of equal to or more than 1 MPa, safely, at low cost and efficiently.

Also, an apparatus for leak test according to the present invention allows for preferably implementing the method for leak test according to the present invention.

BRIEF DESCRIPTIONS OF DRAWINGS

DETAILED DESCRIPTION

Embodiments of the present invention are hereinafter described in detail with reference to accompanying drawings.

Figure 1:
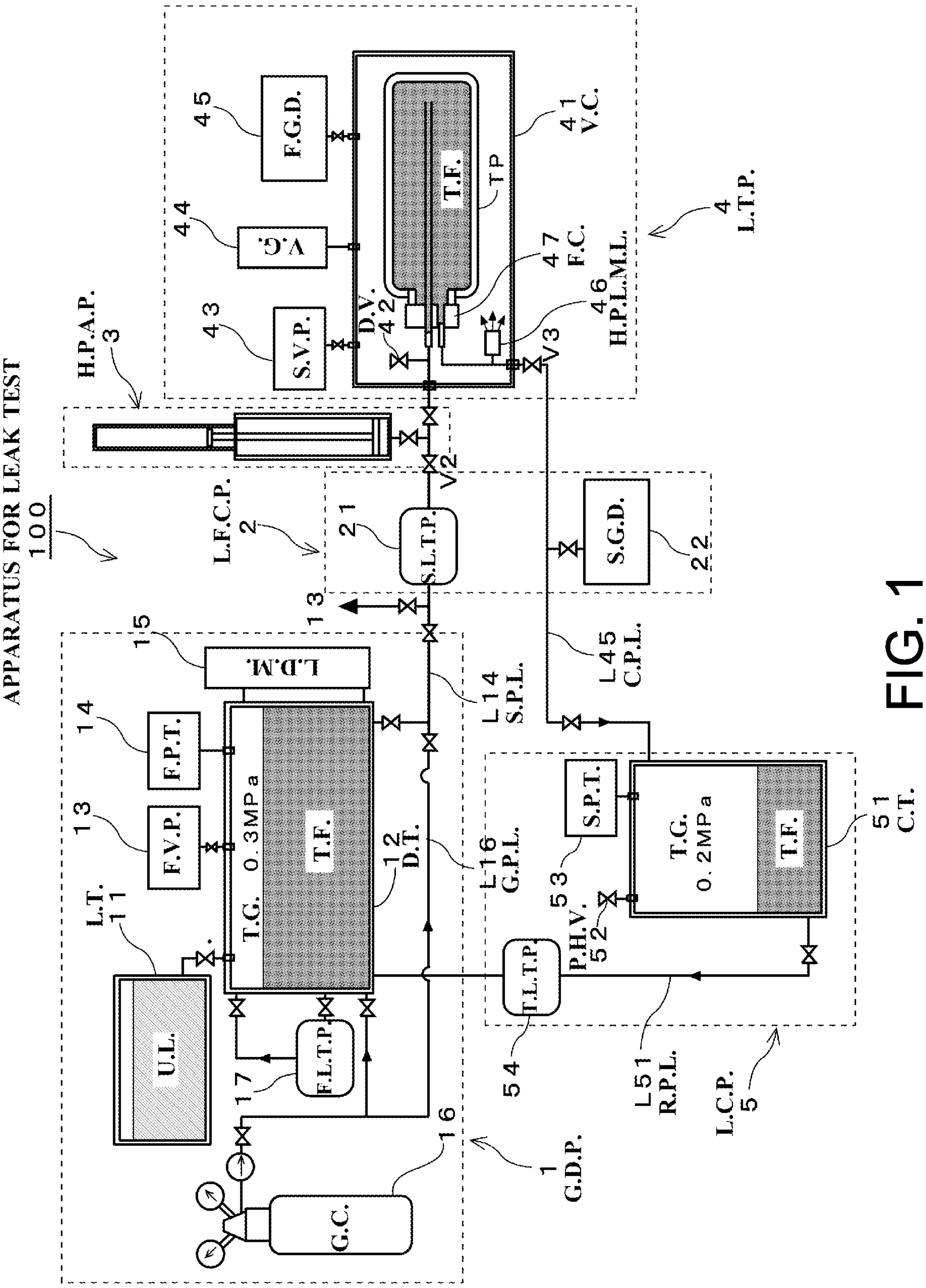
FIG. 1 is an explanatory illustration to show a main part of an apparatus for leak test in accordance with a first embodiment of the present invention.

FIG. 1 is an explanatory illustration to show a main part of an apparatus 100 for leak test in accordance with a first embodiment of the present invention.

This apparatus 100 for leak test is configured to allow for safely, at low cost and efficiently conducting a leak test for high-pressure containers and components under a high-pressure condition of 1 MPa to 100 MPa. It should be noted that this apparatus 100 for leak test is configured to allow for dissolving a gas of constant high concentration in a liquid (trace fluid) to fill in various types of test piece TP in short time.

In achievement of the aforementioned configuration, the apparatus 100 for leak test comprises: a gas dissolution portion (G.D.P.) 1 for manufacturing the trace fluid (T.F.) to be gas dissolved liquid of constant high concentration; a liquid filling and circulation portion (L.F.C.P.) 2 for filling the trace fluid (T.F.) in the test piece TP; a high-pressure application portion (H.P.A.P.) 3 for pressurizing the trace fluid filled in the test piece TP to a predetermined pressure; a leak test portion (L.T.P.) 4 for detecting a leak quantity of trace gas (T.G.) in the trace fluid leaking out into a vacuum container (V.C.) 41 through leak hole(s) of the test piece TP due to being pressurized; and a liquid collection portion (L.C.P.) 5 for collecting the trace fluid from the interior of the test piece TP relieved from high pressurization. It should be noted that the "trace gas" said herein means a gas (gas stored in a gas cylinder (G.C.) 16) of detected object dissolved in the trace fluid. Also, it should be noted that the "trace fluid" means a liquid where the "trace gas" is dissolved. Each of the elements is further described below.

The gas dissolution portion (G.D.P.) 1 comprises a liquid tank (L.T.) 11 for storing an unused liquid (U.L.) to be not yet degasified liquid before having been through a degasifying process, a dissolution tank (D.T.) 12 for storing the trace fluid where the trace gas of constant concentration has dissolved in an already degasified liquid, a first vacuum pump (F.V.P.) 13 for gasifying and removing impure gases (air, water vapor) dissolved in the unused liquid, a first pressure transducer (F.P.T.) 14 to detect a pressure (gas dissolution pressure) in the upper space (head space) on the liquid level of the dissolution tank (D.T.) 12, a liquid degasification monitor (L.D.M.) 15 for monitoring a degasified state in the liquid, a gas cylinder (G.C.) 16 for storing the trace gas, and a first liquid transfer pump (F.L.T.P.) 17 for circulating the trace fluid in the dissolution tank (D.T.) 12. It should be noted that the detail of gas dissolution process is described below with reference to FIG. 2.

The liquid filling and circulation portion (L.F.C.P.) 2 comprises a second liquid transfer pump (S.L.T.P.) 21 for filling in the interior of the test piece TP the trace fluid of constant concentration where the trace gas has dissolved in the already degasified liquid, and a second gas detector (S.G.D.) 22 for detecting the concentration of the trace gas in the trace fluid flowing in a collection pipe line (C.P.L.) L45. It should be noted that the detail of liquid filling process is described below with reference to FIG. 2.

The high-pressure application portion (H.P.A.P.) 3 comprises a reciprocal pump, a plunger pump, or a hydraulic cylinder, for example. It should be noted that the detail of high-pressure application process is described below with reference to FIG. 2.

The leak test portion (L.T.P.) 4 comprises a vacuum container (V.C.) 41 for accommodating the test piece TP in the interior thereof being put on a vacuum condition, a discharge valve (D.V.) 42 for communicating the interior of the test piece TP with the interior of the vacuum container (V.C.) 41 as well as for drawing the interior of the test pierce TP into a vacuum condition, a second vacuum pump (S.V.P.) 43 to draw the interior of the vacuum container (V.C.) 41 into a vacuum condition, a vacuum gauge (V.G.) 44 to measure a degree of vacuum of the interior of the vacuum container (V.C.) 41, a first gas detector (F.G.D.) 45 to detect the trace gas in the trace fluid leaking out through leak hole(s) of the test piece TP, a high-pressure liquid master leak (H.P.L.M.L.) 46 to make a predetermined leak flow rate of the gas in the trace fluid under a predetermined pressurization, and a fastener cap (F.C.) 47 for allowing a filling pipe line (supply pipe line L14) to be air-tightly connected to the mouth portion (inlet portion) of the test piece TP. It should be noted that the detail of leak test process is described below with reference to FIG. 2.

The liquid collection portion (L.C.P.) 5 comprises a collection tank (C.T.) 51 for collecting the trace fluid in the test piece TP, a pressure hold valve (P.H.V.) 52 for keeping at a predetermined pressure value a gas dissolving pressure (pressure of the upper space on the liquid level) for the trace gas in the collection tank (C.T.) 51, a second pressure transducer (S.P.T.) 53 to detect the gas dissolving pressure (pressure of the upper space on the liquid level) for the trace gas in the collection tank (C.T.) 51, and a third liquid transfer pump (T.L.T.P.) 54 to transfer to the dissolution tank (D.T.) 12 the trace fluid in the collection tank (C.T.) 51. It should be noted that the detail of collection process is described below with reference to FIG. 2.

Figure 2:
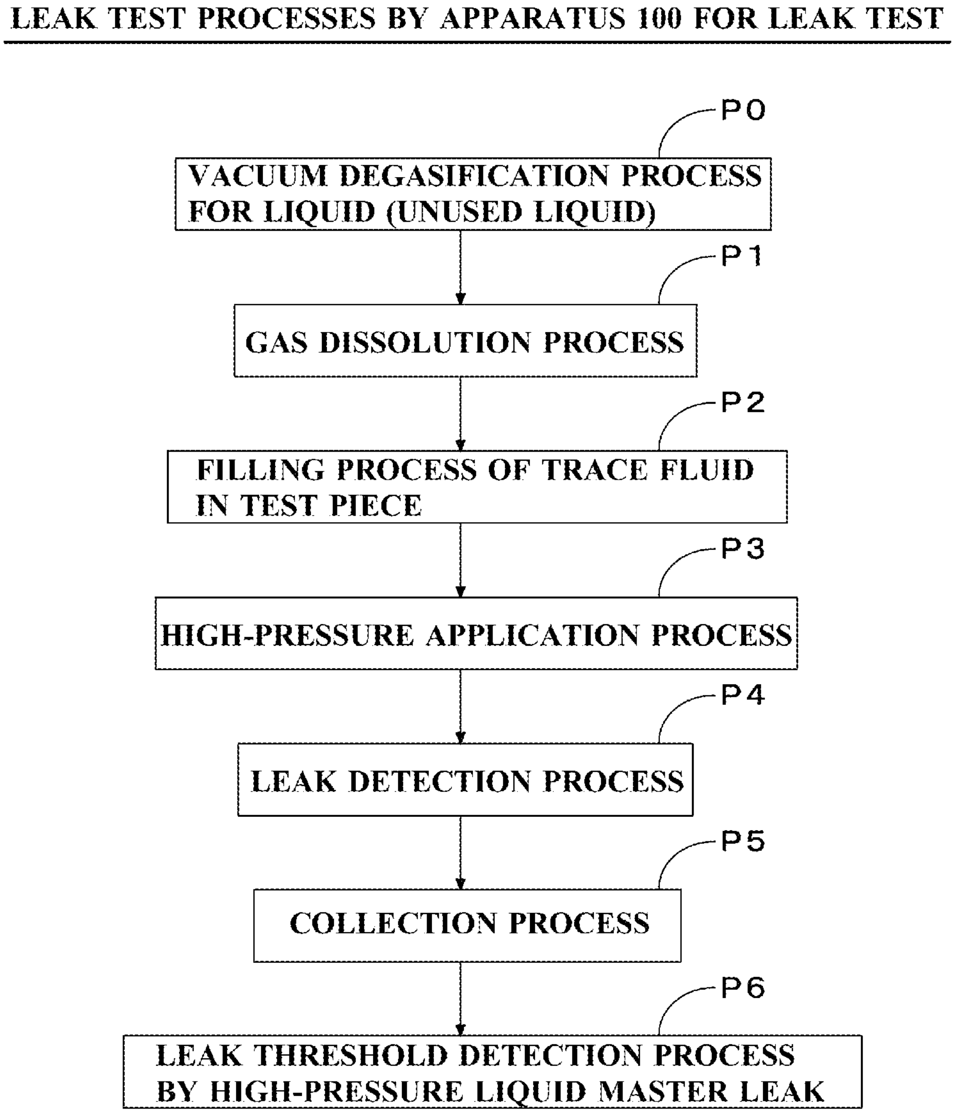
FIG. 2 is a process flow diagram to show leak test processes by using an apparatus for leak test in accordance with a first embodiment of the present invention. part of vertical-direction sliding mechanism in accordance with the present invention.

FIG. 2 is a process flow diagram to show the leak test processes by using the apparatus 100 for leak test in accordance with a first embodiment of the present invention.

First, in the process P0, it is conducted to do a vacuum degasification process for the liquid (unused liquid) where the trace gas is dissolved. The reason to implement the vacuum degasification is because the concentration of dissolved gas becomes high when gas is made to be dissolved in the liquid at low gas pressure (e.g., 0.3 MPa) in the process P1 mentioned below. It should be noted that the term "unused liquid" as used herein means a gas dissolved liquid not yet having completed with degasification.

Specifically, it is conducted to fill the unused liquid of the liquid tank (L.T.) 11 in the dissolution tank (D.T.) 12. Then, it is conducted to draw into a vacuum a head space on the liquid level by utilization of the first vacuum pump (F.V.P.) 13 and remove air and water vapor dissolved in the unused liquid to be gasified due to drawing into a vacuum. At the same time, it is conducted to circulate the liquid in the dissolution tank (D.T.) 12 by utilizing of the first liquid transfer pump (F.L.T.P.) 17, to facilitate the vacuum degasification. Meanwhile, the pressure of the vacuum degasification had better more or less an equilibrium vapor pressure (saturated vapor pressure), so as to prevent some exhaust loss in the first vacuum pump (F.V.P.) 13 due to vaporization of the liquid.

It should be noted that, when the equilibrium vapor pressure is equal to or more than $1\times10^4$ Pa (one-tenth of the atmosphere pressure), regarding the vacuum draw by utilization of the first vacuum pump (F.V.P.) 13, it is effective for an enough degasification to draw for seconds to tens of seconds into a vacuum where pressure is lower than the equilibrium vapor pressure. Then, the degasification of the liquid can be checked by utilization of the liquid degasification monitor (L.D.M.) 15. This liquid degasification monitor (L.D.M.) 15 is described below with reference to FIG. 11 and FIG. 12

In the process P1, it is conducted to do a gas dissolution process. Specifically, the trace gas is supplied from the gas cylinder (G.C.) 16 in the liquid (liquid degasified in vacuum or liquid collected from the collection tank (C.T.) 51) in the dissolution tank (D.T.) 12. The pressure of the upper space (pressure of the head space) in the dissolution tank (D.T.) 12 is adjusted to a predetermined value (any of range of equal to or more than 0.1 MPa to 1 MPa, for example, 0.3 MPa in the embodiment), and the liquid in the dissolution tank (D.T.) 12 is circulated by utilization of the first liquid transfer pump (F.L.T.P.) 17, so that the trace gas is dissolved in the liquid.

In the process P2, it is conducted to do a filling process of the trace fluid in the test piece TP. Specifically, the trace fluid manufactured in the aforementioned process P1 is filled the test piece TP set in the vacuum container (V.C.) 41 in the leak test portion (L.T.P.) 4, by utilization of the second liquid transfer pump (S.L.T.P.) 21. At this time, the discharge valve 42 is made open and the interior of the test piece TP is drawn into a vacuum condition as well as the vacuum container (V.C.) 41, by the second vacuum pump 43. Additionally, the liquid conduit (the supply pipe line (S.P.L.) L14) and the interior of the second liquid transfer pump (S.L.T.P.) 21 are put on a vacuum condition by the first vacuum pump (F.V.P.) 13.

It should be noted that the pressure of the interior of the test piece TP is set at a value equal to a vacuum condition (10 to 1000 Pa) or, by introducing trace gas, another value equal to 1000 Pa to a gas dissolving pressure (e.g., 0.3 MPa). Then, the trace fluid is filled in the interior of the test piece TP. At the beginning of the filling are gasifying some of the trace gas dissolved in the trace fluid to stay in the interior of the test piece TP, therefore the test piece TP have to be vibrated, kept still, or additionally pressurized so that the gasified trace gas is dissolved in the trace fluid again.

The trace fluid is flown into the collection tank (C.T.) 51 (specifically, the quantity of the trace fluid is flown so that the trace fluid in the interior of the test piece TP can reach the second gas detector (S.G.D.) 22), thereby it is confirmed that the test piece TP is liquid-tightly filled with the trace fluid where the trace gas is dissolved at a predetermined concentration of the gas. The concentration of the trace gas in the trace fluid filled in the test piece TP is confirmed by the second gas detector (S.G.D.) 22 disposed downstream of the test piece TP.

In the process P3, it is conducted to do a high-pressure application process. After the trace fluid is filled in the interior of the test piece TP, an upstream-valve V2 of the high-pressure application portion (H.P.A.P.) 3 and a downstream-valve V3 of the vacuum container (V.C.) 41 are all closed, the trace fluid is sealed in a closed flow path. Subsequently, the trace fluid in the interior of the test piece TP is pressurized so high as equal to or more than 1 MPa (100 MPa, for example), by utilization of the high-pressure application portion (H.P.A.P.) 3.

In the process P4, it is conducted to do a leak detection process. The trace fluid leaking out through leak hole(s) of the test piece TP into the vacuum container (V.C.) 41, has the liquid vaporized as well as the trace gas (dissolution gas) gasified. The trace gas gasified in vacuum is detected by the first gas detector (F.G.D.) 45. When there is detected a leak flow rate equal to or more than a predetermined threshold with respect to the trace fluid, it is to be judged that a leak is present.

In the process P5, it is conducted to do a collection process. After completion of the aforementioned leak detection process P4, it is relieved from being highly pressurized by a high-pressure application portion (H.P.A.P.) 3. Then, the valve V2 for introducing gas, connected to an upstream pipe line of the test piece TP, is open and the gas is introduced from the gas cylinder (G.C.) 16 (pressure example: 0.3 MPa equal to the gas dissolving pressure). On the other hand, the liquid collection portion (L.C.P.) 5 has the collection tank (C.T.) 51 drawn a vacuum in head space by vacuum pump (not shown), to collect the trace fluid expelled from the test piece TP. After completion of liquid collection, the trace fluid collected in the collection tank (C.T.) 51 is transferred to the dissolution tank (D.T.) 12 in the gas dissolution portion (G.D.P.) 1, by utilization of the third liquid transfer pump (T.L.T.P.) 54.

In the process P6, it is conducted to do a leak threshold detection process (validation confirmation process for the apparatus for leak test) by utilization of the high-pressure liquid master leak (H.P.L.M.L.) 46. In the state that there is not set test piece TP inside of the vacuum container (V.C.) 41 (in the state that the supply pipe line (S.P.L.) L14 and the collection pipe line (C.P.L.) L45 connect to each other), the trace fluid in the dissolution tank (D.T.) 12 is filled in the high-pressure liquid master leak (H.P.L.M.L.) 46 which is made of sintered body of metal powder, having a predetermined leak threshold with respect to leak flow rate of the trace gas. It should be noted that it is previously confirmed that there normally flows the trace fluid where gas is dissolved at constant concentration, by the second gas detector (S.G.D.) 22 disposed downstream of the high-pressure liquid master leak (H.P.L.M.L.) 46, before filled therein. Then, the trace fluid in the high-pressure liquid master leak (H.P.L.M.L.) 46 is applied with a high pressure equal to or more than 1 MPa (100 MPa, for example) by utilization of high-pressure application portion (H.P.A.P.) 3 and the trace gas in the leaked trace fluid is detected by the first gas detector (F.G.D.) 45. That is, the confirmation of validation for the leak test is conducted by both one verification of the gas concentration in the trace fluid (gas is dissolved in the trace fluid at constant concentration) by the second gas detector (S.G.D.) 22 and other verification of leak threshold detection of the trace gas by the first gas detector (F.G.D.) 45. It is, thereby, possible to verify whether or not normally enabling to conduct the high-pressure leak test. This verification of the leak threshold detection of the trace gas by the high-pressure liquid master leak (H.P.L.M.L.) 46 is conducted a few times a day.

Figure 3:
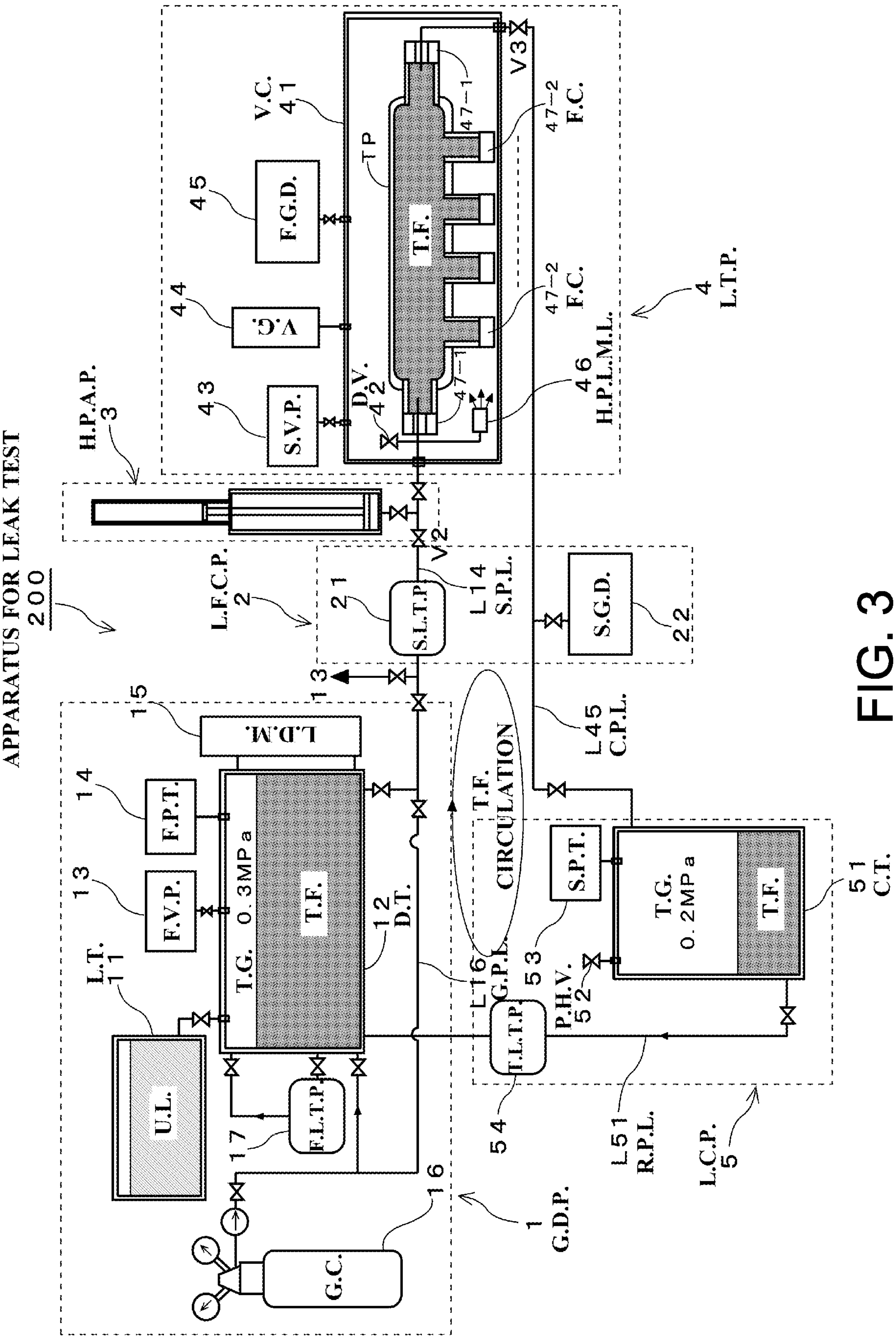
FIG. 3 is an explanatory illustration to show a main part of an apparatus for leak test in accordance with a second embodiment of the present invention.

FIG. 3 is an explanatory illustration to show a main part of an apparatus 200 for leak test in accordance with a second embodiment of the present invention.

This apparatus 200 for leak test allows for conducting leak test for a test piece TP having equal to or more than two ports, relatively small volume (1 liter, for example). The configuration of this apparatus 200 for leak test is almost same as that of the aforementioned apparatus 100 for leak test. The only difference from the apparatus 100 for leak test is that the test piece TP has equal to or more than two ports and relatively small volume (1 liter, for example).

A method for leak test by the apparatus 200 is also almost same as the aforementioned processes in FIG. 2. The difference is, compared to trace fluid filling in the test piece TP of the process P2 in FIG. 2, following two things:

(1) the interior of the test piece TP before filled with the trace fluid, arranged to be filled with the trace gas having less than the gas dissolving pressure, can be set so that the pressure is the equilibrium vapor pressure of the liquid (vacuum condition);

(2) the trace fluid with constant concentration related to the trace gas, of which the filled quantity is equal to or more than 2 times of the volume of the test piece TP, would be filled in the test piece TP, from the aspect that the trace fluid with constant concentration should be filled with the interior of the test piece TP.

Figure 4:
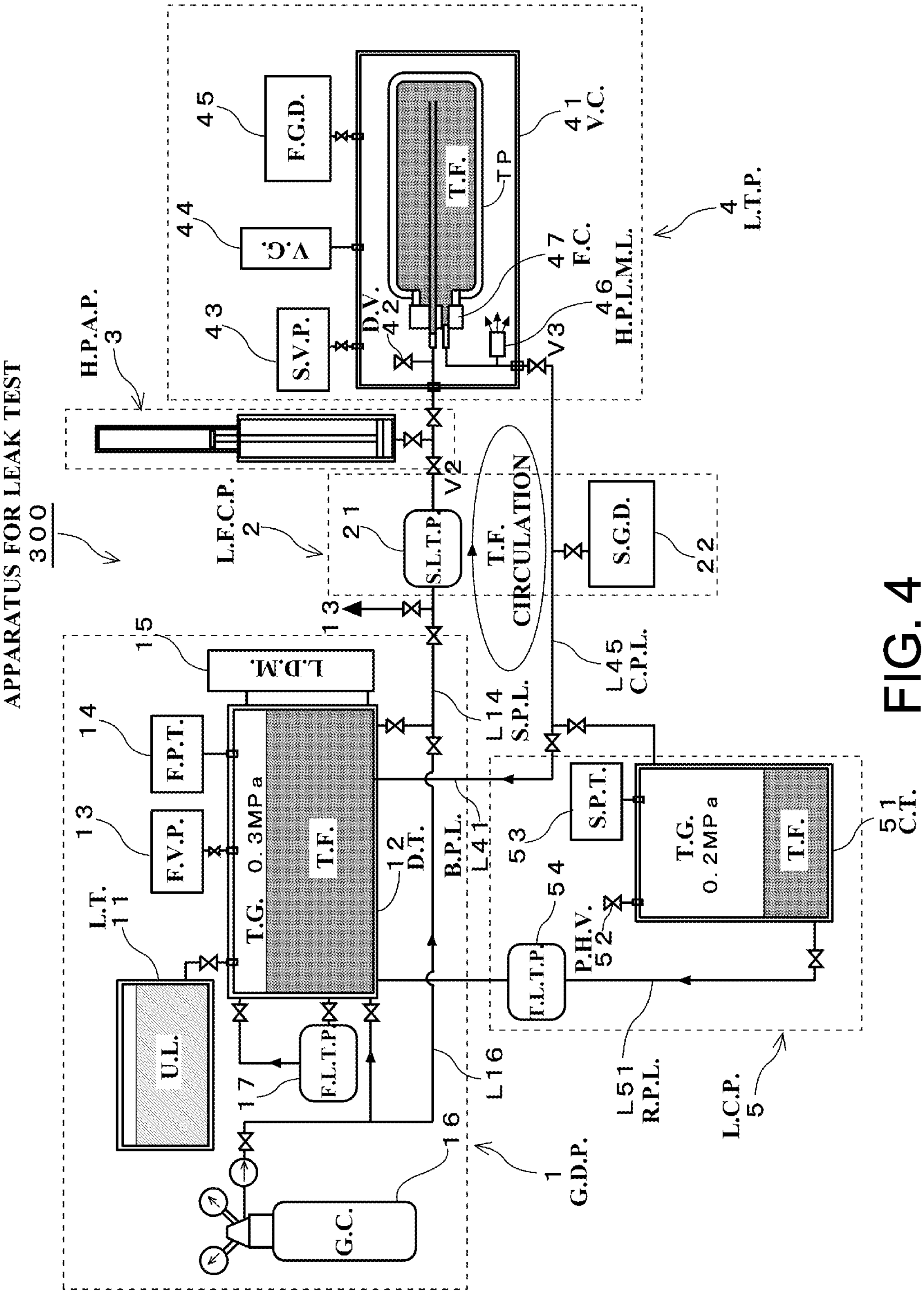
FIG. 4 is an explanatory illustration to show a main part of an apparatus for leak test in accordance with a third embodiment of the present invention.

FIG. 4 is an explanatory illustration to show a main part of an apparatus 300 for leak test in accordance with a third embodiment of the present invention.

This apparatus 300 for leak test allows for conducting leak test for a test piece TP of large volume (50 liter, for example) having a large single port or complex mechanisms. The configuration of this apparatus 300 for leak test is almost same as that of the aforementioned apparatus 100 for leak test. The difference from the apparatus 100 for leak test is that the bypass pipe line (B.P.L.) L41 is provided to directly return back the trace fluid flown out from the test piece TP to the dissolution tank (D.T.) 12 in the gas dissolution portion (G.D.P.) 1.

The circulation of the trace fluid in the closed flow path according to the aforementioned apparatus 100,200 for leak test, would result in that the trace fluid is produced at low concentration related to the trace gas in the collection tank (C.T.) 51. If it is conducted the method for the leak test in FIG. 2 in the test piece TP with a large volume, the dissolution tank (D.T.) 12 would be required for an extra-large volume. However, the circulation of the trace fluid in the closed flow path according to the aforementioned apparatus 300 for leak test, allows the trace fluid flown out from the test piece TP directly to be returned back to the dissolution tank (D.T.) 12 through the bypass pipe line (B.P.L.) 41. Consequently, even though the gasified gas resulting from the initial filling of the trace fluid stays in the interior of the test piece TP, the staying gas (trace gas) is to be redissolved in the trace fluid by the circulation of the trace fluid, thereby the concentration of the redissolved trace gas resulting from the circulation of the trace fluid is prevented from being lacking in uniformity.

Also, the volume (500 liter, for example) of the trace fluid in the dissolution 12 can be larger than the volume (50 liter, for example) of the interior of the test piece TP.

Figure 5:
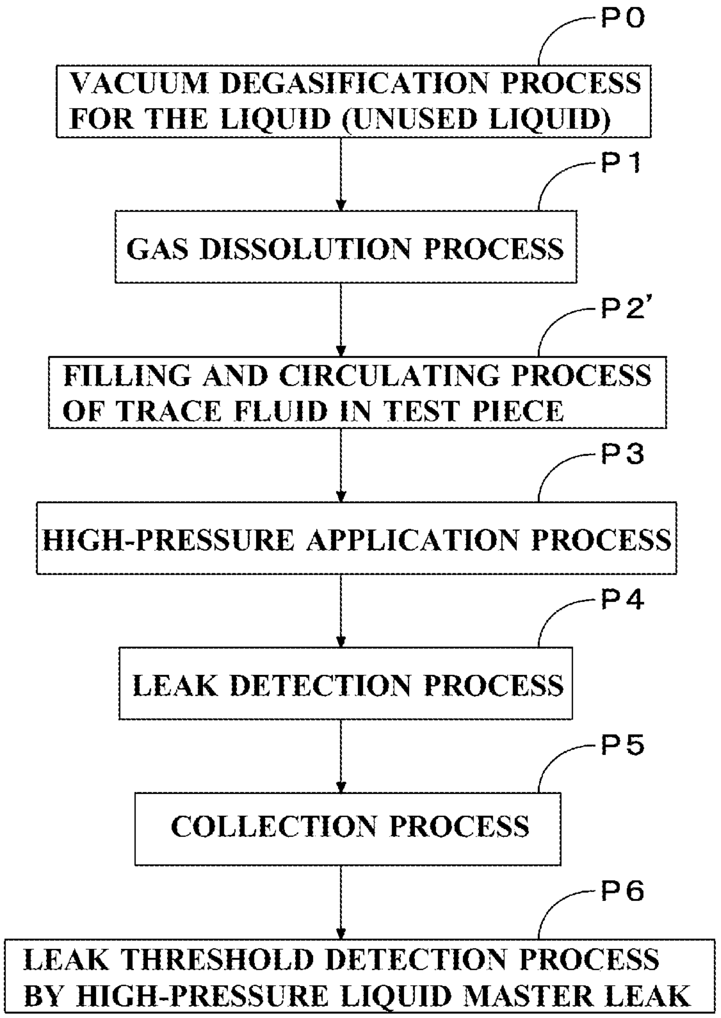
FIG. 5 is a process flow diagram to show leak test processes by using an apparatus for leak test in accordance with a third embodiment of the present invention.

FIG. 5 is a process flow diagram to show leak test processes by using an apparatus 300 for leak test in accordance with a third embodiment of the present invention.

In the leak test processes by utilization of the apparatus 300 for leak test, the difference process is the process P2' of "filling and circulating process of the trace fluid in the test piece TP", compared to the leak test processes by utilization of the apparatus 100 for leak test. This is described below.

In the filling and circulating process of the trace fluid in the test piece TP, like the process P2 in the aforementioned FIG. 2, the interior of the test piece TP has the pressure set a pressure equal to vacuum condition (10 Pa to 1000 Pa, for example) as kept drawn a vacuum, or equal to or more than 1000 Pa and less than gas dissolving pressure (0.3 MPa, for example) as introducing the trace gas. The trace fluid where the gas is dissolved, manufactured in the gas dissolution portion (G.D.P.) 1, is to be filled in the test piece TP set in the vacuum container (V.C.) 41 of the leak test portion (L.T.P.) 4, by utilization of the second liquid transfer pump (S.L.T.P.) 21. Note that since the trace gas dissolved in the trace fluid is gasified at the beginning of the filling, the initially filled trace fluid are made flown into the collection tank (C.T.) 51. Then, the trace fluid having passed through the test piece TP is made to be returned to the dissolution tank (D.T.) 12 through the bypass pipe line (B.P.L.) L41 in the circulation route where gas dissolved trace fluid starts from the dissolution tank (D.T.) 12, passing the test piece TP and returning to the dissolution tank (D.T.) 12. The test piece TP is, thereby, to be filled with the trace fluid where the gas is dissolved at a predetermined concentration. The concentration of the gas in the trace fluid filled in the trace piece TP is to be confirmed by the second gas detector (S.G.D.) 22 disposed downstream of the test piece TP.

Figure 6:
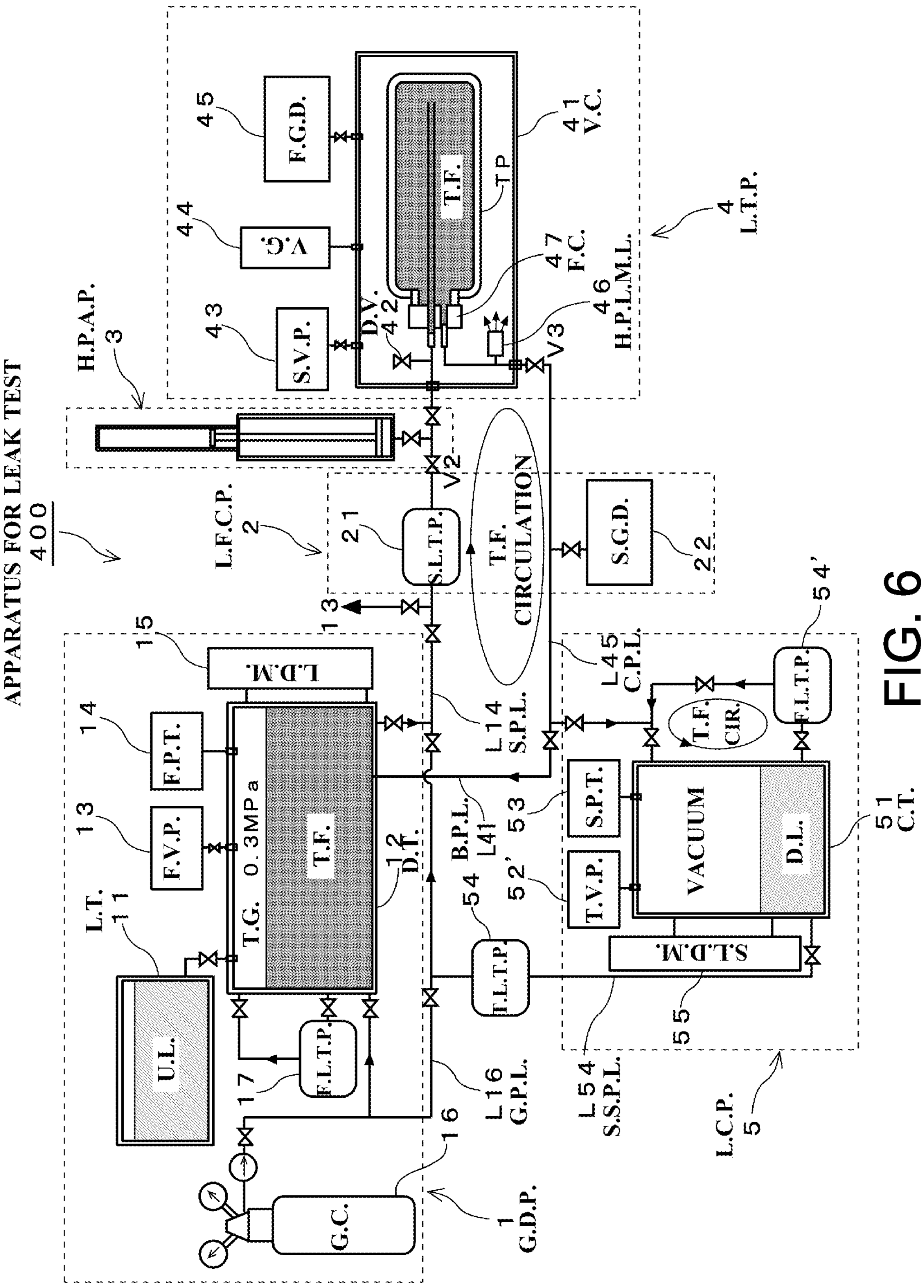
FIG. 6 is an explanatory illustration to show a main part of an apparatus for leak test in accordance with a fourth embodiment of the present invention.

FIG. 6 is an explanatory illustration to show a main part of an apparatus 400 for leak test in accordance with a fourth embodiment of the present invention.

This apparatus 400 for leak test is configured that a liquid where none of the gas is dissolved (hereinafter as referred to as "degasified liquid") is filled in the test piece TP in vacuum condition, in order to prevent from lacking of the concentration uniformity with the trace gas due to staying of the gasified gas.

In order to fill the degasified liquid in the test piece TP in vacuum condition, the liquid collection portion (L.C.P.) 5 comprises a third vacuum pump (T.V.P.) 52', a fourth liquid transfer pump (F.L.T.P) 54', and a second liquid degasification monitor (S.L.D.M.) 55. Also, in order to transfer the degasified liquid into the test piece TP from the collection tank (C.T.) 51, a pipe line connected to outlet of third liquid transfer pump (T.L.T.P.) 54 is to be connected not to the dissolution tank (D.T.) 12 but to the gas pipe line (gas pipe line (G.P.L.) L16). As in the aforementioned apparatus 300 for leak test, is also provided a circulation route where the trace fluid is circulated between the dissolution tank (D.T.) 12 and the test piece TP.

Figure 7:
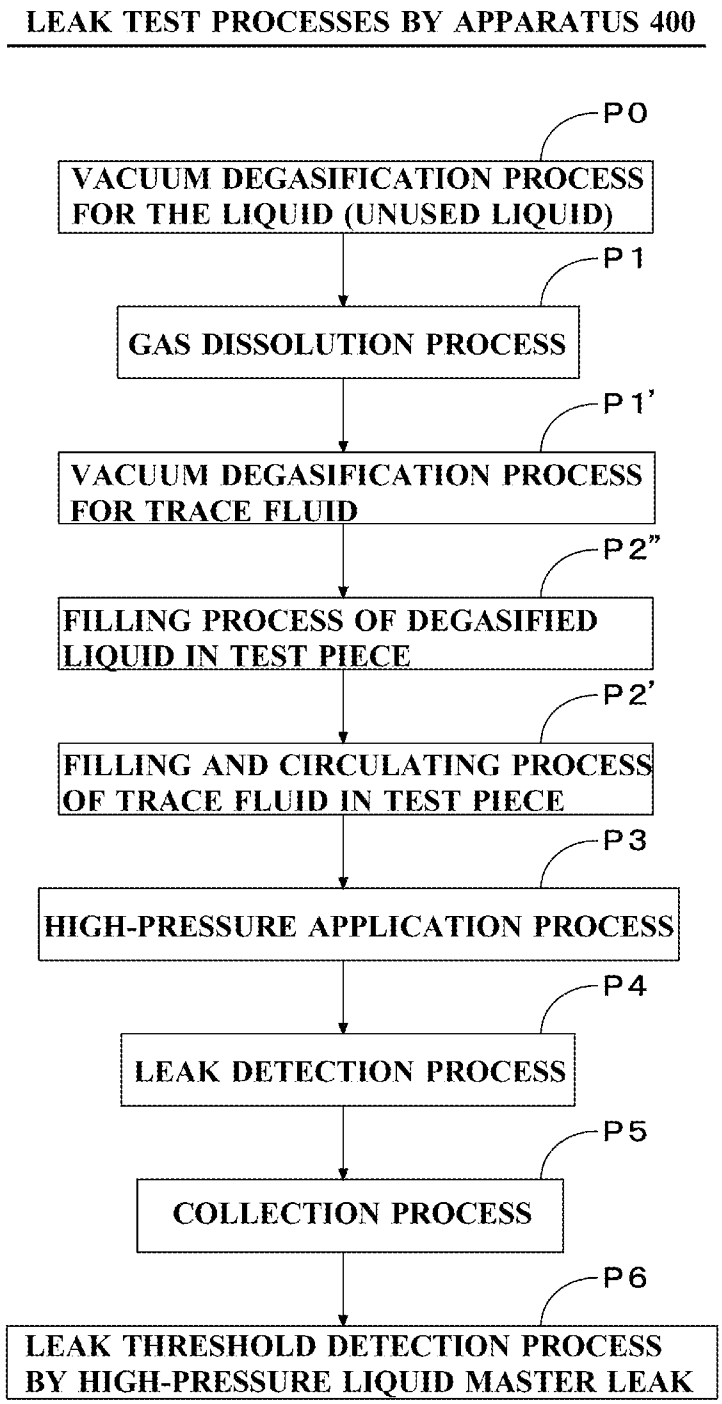
FIG. 7 is a process flow diagram to show leak test processes by using an apparatus for leak test in accordance with a fourth embodiment of the present invention.

FIG. 7 is a process flow diagram to show leak test processes by using an apparatus 400 for leak test in accordance with a fourth embodiment of the present invention.

In the leak test processes by utilization of the apparatus 400 for leak test, compared to the leak test processes by utilization of the apparatus 300 for leak test, there are newly provided the process P1' of degasifying the trace fluid in vacuum and the process P2" of the degasified liquid filling in the test piece TP, and there is modified the process P2' of the trace fluid filling and circulating in the test piece TP. These are described below.

In the process P1' of degasifying the trace fluid in vacuum, the upper space over the liquid level of the collection tank (C.T.) 51 is drawn in vacuum condition by the third vacuum pump (T.V.P.) 52'. The trace gas dissolved in the trace fluid is, thereby, gasified to be exhausted by the third vacuum pump (T.V.P.) 52'. In this case, the circulation of the trace fluid by the fourth transfer pump 54' allows the gasification of the trace gas to be more facilitated. The degasification is, at the end, to be completed, and consequently the trace fluid is changed the degasified liquid. Whether or not the degasification is completed can be confirmed by the second liquid degasification monitor (S.L.D.M.) 55.

In the process P2" of the degasified liquid filling in the test piece TP, the degasified liquid is, by the second liquid transfer pump (S.L.T.P.) 21, transferred to the interior of the test piece from the collection tank (C.T.) 51. Note that the interior of the test piece TP has the pressure set a pressure equal to vacuum condition (10 Pa to 1000 Pa, for example), or equal to or more than 1000 Pa and less than gas dissolving pressure (0.3 MPa, for example) as introducing the trace gas.

In the process P2' of the trace fluid filling and circulating in the test piece TP, the gas dissolved trace fluid manufactured in the dissolution tank (D.T.) 12 is, by the second liquid transfer pump (S.L.T.P.) 21, filled in the test piece TP to be exchanged with the previously filled degasified liquid. Subsequently, the gas concentration in the gas dissolved trace fluid is to be confirmed by utilization of the second gas detector (S.G.D.) 22. The interior of the test piece TP is to be filled with the trace fluid where the gas is dissolved at a constant concentration through these processes.

The liquid composing the trace fluid are described below.

Regarding the liquid composing the trace fluid, such a liquid is desirable as being easy to dissolve the gas as well as being capable of passing through leak hole(s), further as satisfying the following Expression 1. This reason is described below.

$$[\rho_{Aq}/(\eta_{Aq}\times M_{Aq})]\times[S_{He\text{-}Aq}]>5\times[\rho_W/(\eta_W\times M_W)]\times[S_{He\text{-}W}] \quad \text{(Expression 1):}$$

$\rho_{Aq}$ is the density of the liquid.
$\eta_{Aq}$ is the viscosity coefficient of the liquid.
$M_{Aq}$ is the molecular weight of the liquid.
$S_{He\text{-}Aq}$ is the solubility of helium gas to the liquid
$\rho_W$ is the density of the water.
$\eta_W$ is the viscosity coefficient of the water.
$M_W$ is the molecular weight of the water.
$S_{He\text{-}W}$ is the solubility of helium gas to the water.

[Theoretical Study of Candidates for the Liquid]

When the liquid passes through leak hole(s), since the liquid maintains in viscous flow state, the flow rate of the liquid can be expressed as the following Expression 2, by using characteristic values of the liquid.

$$Q_{Aq}\propto[\rho_{Aq}/(\rho_{Aq}\times M_{Aq})] \quad \text{(Expression 2):}$$

$Q_{Aq}$ is the flow rate of the liquid.
$\rho_{Aq}$ is the density of the liquid.
$\eta_{Aq}$ is the viscosity coefficient of the liquid.
$M_{Aq}$ is the molecular weight of the liquid.

Therefore, if the solubility of the gas to the liquid (mole fraction) is known, it is possible to express as the following Expression 3 the flow rate of the gas detected at leak hole(s) when the gas is made to be dissolved in the liquid under a constant pressure P[MPa]. Now the pressure P[MPa] in gas dissolution should be less than 1 [MPa] from a practical perspective. If the pressure in gas dissolution is needed to be more than 1 [MPa], a superiority of a leak test using liquid is lower, compared with a leak test using high-pressure gas.

$$Q_{Gas}\propto[\rho_{Aq}/(\eta_{Aq}\times M_{Aq})]\times[S_{Gas\text{-}Aq}]\times P \quad \text{(Expression 3):}$$

$Q_{Gas}$ is the flow rate of the detected gas.
$\rho_{Aq}$ is the density of the liquid.
$\eta_{Aq}$ is the viscosity coefficient of the liquid.
$M_{Aq}$ is the molecular weight of the liquid.
$S_{Gas\text{-}Aq}$=the solubility of the gas to the liquid (mole fraction).

Table 1 shows characteristic values of both candidate liquids and water, and ratios of candidate liquids to water related to the flow rate of dissolved helium, when helium gas is used as the gas. It can be found out that it is a fluorinated organic solvent such as hydrofluoroether and hexadecafluoroheptane, or a linear alkane such as pentane and hexane that are suitable as the liquid of the helium dissolved liquid.

TABLE 1

Char. Value of Candidate Liquids and Ratio of $Q_{He}$ to $Q_{He(Aq=water)}$

| | $S_{He\text{-}Aq}$ (Mole Solubility) | $\rho_{Aq}$ (kg/m$^3$) | $\eta_{Aq}$ (Pa · s) | $M_{Aq}$ | $\frac{(S_{He\text{-}Aq}\times\rho_{Aq})}{(\eta_{Aq}\times M_{Aq})}$ | $\frac{Q_{He}}{Q_{He(Aq=water)}}$ |
|---|---|---|---|---|---|---|
| Water ($H_2O$) | $7.25\times10^{-6}$ | 998 | $8.90\times10^{-4}$ | 18 | 0.452 | 1.0 |
| Hydrofluoroether ($C_4F_9OC_2H_5$) | $1.85\times10^{-3}$ | 1430 | $5.70\times10^{-4}$ | 264 | 17.6 | 38.9 |
| Hexadecafluoroheptane ($C_7F_{16}$) | $9.00\times10^{-4}$ | 1870 | $6.70\times10^{-4}$ | 388 | 6.47 | 14.3 |
| pentanc ($C_5H_{12}$) | $2.60\times10^{-4}$ | 630 | $2.34\times10^{-4}$ | 72 | 9.72 | 21.5 |
| hexane ($C_5H_{14}$) | $2.57\times10^{-4}$ | 655 | $2.99\times10^{-4}$ | 86 | 6.55 | 14.5 |

[Study Regarding Restriction of Characteristic Values of Liquids]

Leak hole(s) having such a gas (air) leak flow rate as $1.7\times10^{-4}$ Pam$^3$/s (0.1 cc/min) under ultrahigh-pressure of 100 MPa, would have the diameter of approximately 10 μm when the length thereof is set 60 mm. When the water of liquid flows through the leak hole(s) to leak out in the interior of the vacuum container (V.C.) 41 of the leak test portion (L.T.P.) 4, the water is to be vaporized and gasified at the outlet of the leak hole(s), leaking out vacuum space. In this case the water leak flow rate is calculated to be $7.5\times10^{-6}$ Pam$^3$/s. The mole solubility of helium gas to the water $S_{He\text{-}W}$ is $7.25\times10^{-6}$ at room temperature and atmospheric pressure. If it is assumed that this solubility can be effective until at high-pressure of 1 MPa, the detected flow rate of helium gas dissolved in water is calculated to be $5.4\times10^{-10}$ $Pam^3/s$.

However, since the solubility of the real gas to the liquid can't be 100% and the Henry's Law is considered to be not effective until at high-pressure of 1 MPa, the real solubility is supposed more or less 50% of a value described in a document. Thereby, the detected flow rate of helium gas is practically supposed more or less $2.7\times10^{-10}$ $Pam^3/s$. Considering that the detectable and evaluable leak flow rate of helium gas is $1.0\times10^{-9}$ $Pam^3/s$ in the leak test using the practical mass-produced helium gas, it is obviously impossible to detect the flow rate of dissolved helium in water, $2.7\times10^{-10}$ $Pam^3/s$.

Therefore, if it is assumed to be fully preferred that the flow rate of the dissolved helium in the liquid practically used, is equal to or more than five times than the flow rate of the dissolved helium in water, the aforementioned Expression 1 is to be introduced.

The flow rate of the dissolved helium in the hydrofluoroether (the trade name: 3M™ NOVECK™ 7200 high-functional liquid), is almost 40 times than that of the dissolved helium in water. That is, it is found that it is fully possible to detect the flow rate of the dissolved helium when the hydrofluoroether is used for a liquid for dissolving helium gas even though helium gas is dissolved under lower pressure than 1 MPa. Here the water and the hydrofluoroether are used as liquid for dissolving helium gas, and helium gas is dissolved in the each of water and the hydrofluoroether under low pressure of 3 MPa. It is, with the leak hole(s) having such a gas (air) leak flow rate as $1.7\times10^{-4}$ $Pam^3/s$ under ultrahigh-pressure of 100 MPa, conducted to measure the detected flow rate of the dissolved helium through the leak hole(s) under ultrahigh-pressure of 100 MPa. In the result, it is found that the flow rate of the dissolved helium in water is less than $5\times10^{-10}$ $Pam^3/s$ while the flow rate of the dissolved helium in the hydrofluoroether is less than $2.1\times10^{-9}$ $Pam^3/s$. Considering a response time of leak detection on basis of the volume of the interior of the vacuum container used, it is valid that $2.1\times10^{-9}$ $Pam^3/s$ is almost 60% of calculated value.

Then, the trace gas composing the trace fluid is described below. It is preferred that as the gas used in the leak test process in accordance with the present invention by utilization of trace fluid, is selected gases to be easy to dissolve in the liquid or to be easy for leak to be detected. This is described below,

[Gases to be Easy to Dissolve in Liquid]

As gases to be easy to dissolve in the liquid, there is carbon dioxide gas or ammonia gas to dissolve in the water by chemical reaction. Table 2 shows solubilities of carbon dioxide and ammonia in the water, ratios with the solubility of helium in water, easiness of mass-analysis of gas detector, and safety. Carbon dioxide and ammonia are both so great in solubility in the water, compared with helium. However, ammonia has high flammability and toxicity, and consequently requires an extreme caution in handling so that ammonia is difficult to use in mass-production factories. On the other hand, carbon dioxide is one of candidate gases, when as the liquid is used water, to be able to be dissolved at low-pressure of 0.3 MPa and it is, with the leak hole(s) having such a gas (air) leak flow rate as $17\times10^{-4}$ $Pam^3/s$ under ultrahigh-pressure of 100 MPa, conducted to measure the detected flow rate of the dissolved carbon dioxide through the said leak hole(s) under ultrahigh-pressure of 100 MPa. In the result, it is found that the flow rate of the dissolved carbon dioxide in water can be detected at $80\times10^{-9}$ $Pam^3/s$.

Here, as the gas detector is used a high-sensitive quadrupole mass analyzer. Therefore, it took almost 10 minutes to set the reached pressure of vacuum container (V.C.) 41 at less than $10^{-3}$ Pa without the test piece TP. Therefore, when as the trace gas is used carbon dioxide, the test piece TP is restricted to be of a small volume.

After the leak test using carbon dioxide has been conducted several times, the quadrupole mass analyzer is deteriorated in sensitivity. This deterioration of the sensitivity results from the affection of the water of the liquid where carbon dioxide is dissolved, and so, it is possible to be prevented by disposing a cooler trap (whose temperature rang is from 200K to 220K) before the first gas detector (F.G.D.) 45.

From the aforementioned, it is found that carbon dioxide is the most suitable as gas to be easy to dissolve in the liquid.

TABLE 2

| Solubilities in water with Carbon Dioxide, Anmonia and Helium | | | | |
|---|---|---|---|---|
| | $S_W$ (Mole Solubility) | Ratio with $S_{He—W}$ | Easiness OF Mass Analysis | Safety |
| Helium | $7.25\times10^{-6}$ | 1.0 | ◎ | ◎ |
| Carbon Dioxide | $1.28\times10^{-3}$ | 177 | Δ (Background) | ◎ |
| Anmonia | $9.71\times10^{-1}$ | $1.34\times10^{5}$ | Δ (Same As With OH at m/z 17) | X Flammability and Toxic |

[Gases to be Easy for Leak to be Detected]

In the present invention, as detecting the gas dissolved in the liquid, the first gas detector (F.G.D.) 45 as leak detection means is required to detect extremely small amounts of the gas. As a gas detector capable of detecting extremely small amounts of the gas, can be used a quadrupole mass analyzer or a magnetic field deflection mass analyzer which is to ionize the gases to individually separate the ionized gases per every m/z (equal to mass/charge ratio). As gas to be easy to separate per every m/z, can be used inert gases belonging to the $18^{th}$ group element such as helium or argon, for example.

Especially, helium is a trace gas the most generally used in leak test and so, such a leak detector as called helium leak detector is offered commercially that a leak test method using the leak detector is established. In a high-pressure leak test using gas dissolved liquid according to the present invention, as described in the aforementioned [Theoretical Study of Candidates for the Liquid], the utilization of the liquid such as hydrofluoroether where the gas is easily dissolved and flown, is to allow for conducting the leak test of high-pressure for leak hole(s) having a gas leak flow rate of extremely small amounts under high-pressure condition.

From the aforementioned, it is found that inert gases belonging to the 18th group element such as helium or argon are preferred as gas to be easy for leak to be detected and helium is the most preferred among them.

[High-Pressure Liquid Master Leak]

In leak hole(s) having a threshold of gas leak flow rate of extremely small amounts ($1.7\times10^{-4}$ $Pam^3/s$, for example) under ultrahigh-pressure condition (100 MPa, for example), the diameter of the leak hole is almost equal to or less than 1 μm. Therefore, it is extremely difficult that the high-pressure liquid master leak (H.P.L.M.L.) 46 of the leak test portion (L.T.P.) 4 is made of conventional glass capillary tubes such as capillary-leak.

Thus, the high-pressure liquid master leak (H.P.L.M.L.) 46 in accordance with the present invention, is comprised of many layers of metal sintered body. This high-pressure liquid master leak (H.P.L.M.L.) 46 is comprised of the sintered body made of metal particles with a size of particle diameter of a few μm to hundreds μm, and has leak hole(s) whose average diameter is tens μm to hundreds μm, allowing for a leak flow rate of extremely small amounts under ultrahigh-pressure condition.

[Fastener Cap for Large Volumetric Test Piece with Single Port]

Figure 8:
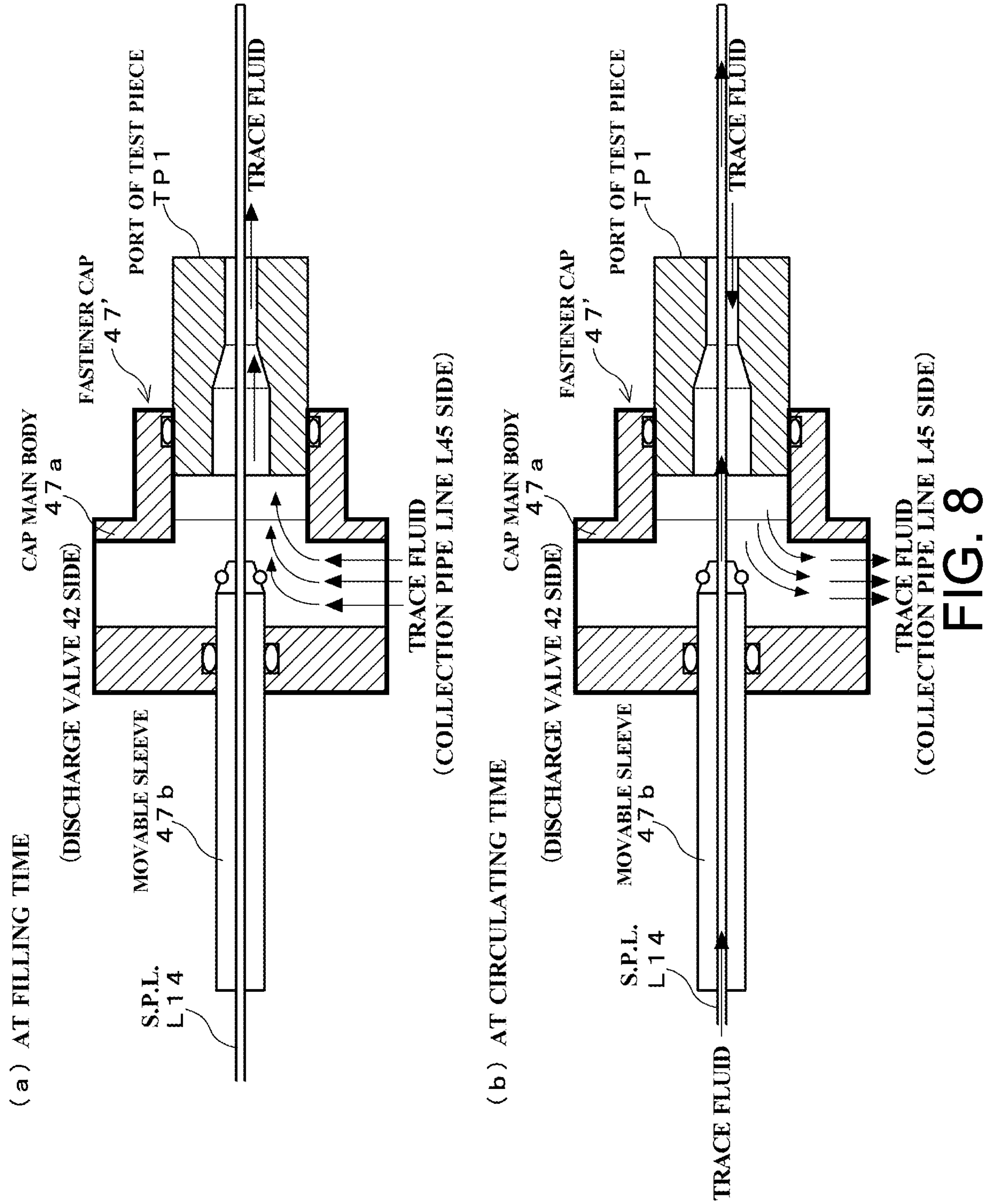
FIG. 8 is an explanatory illustration to a fastener cap for a large volumetric test piece with single port in accordance with the present invention, in the time of filling or circulating the gas dissolved liquid.
Figure 9:
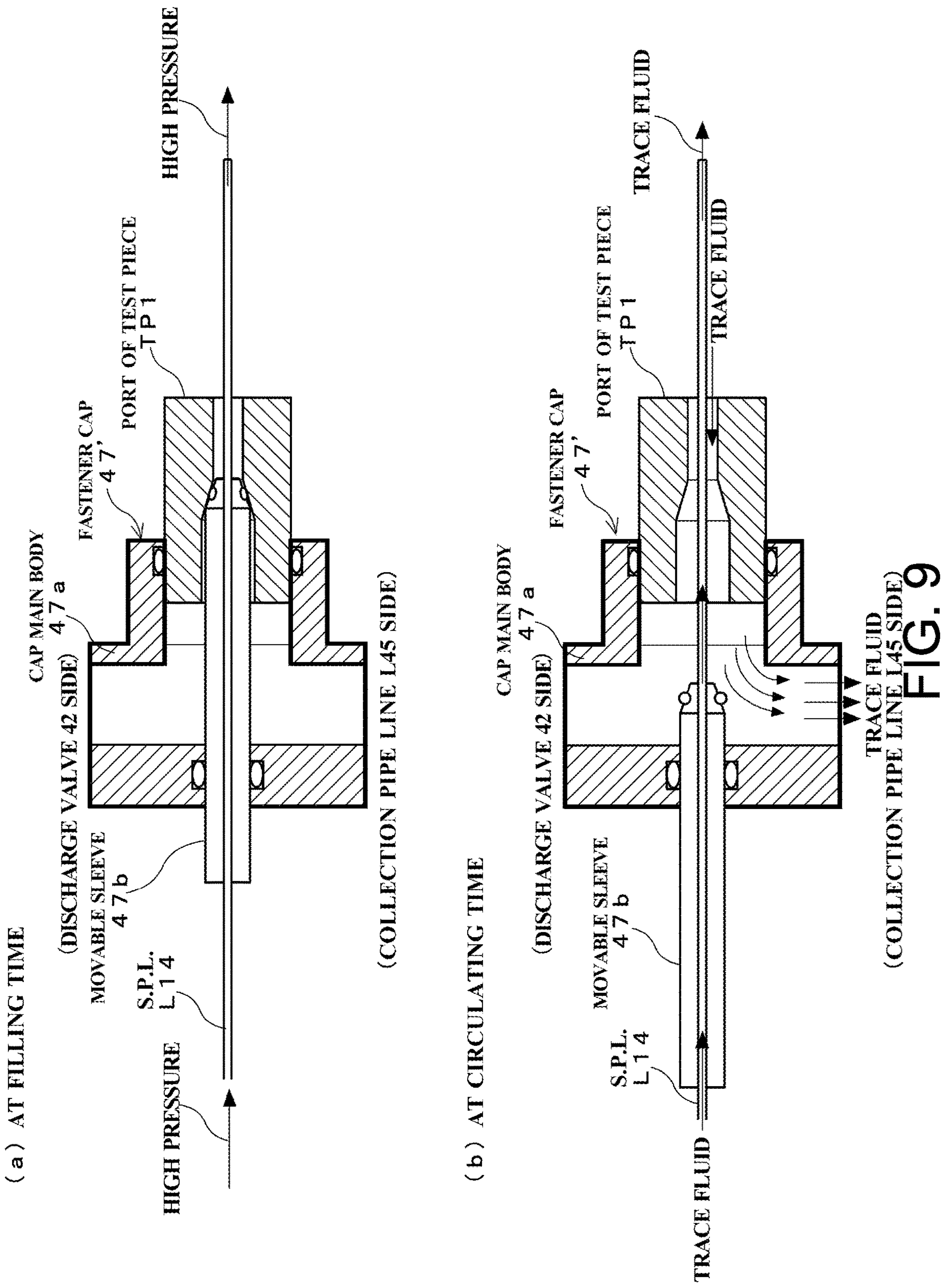
FIG. 9 is an explanatory illustration to a fastener cap for a large volumetric test piece with single port in accordance with the present invention, in the time of application of high pressure to or collecting the gas dissolved liquid.
Figure 10:
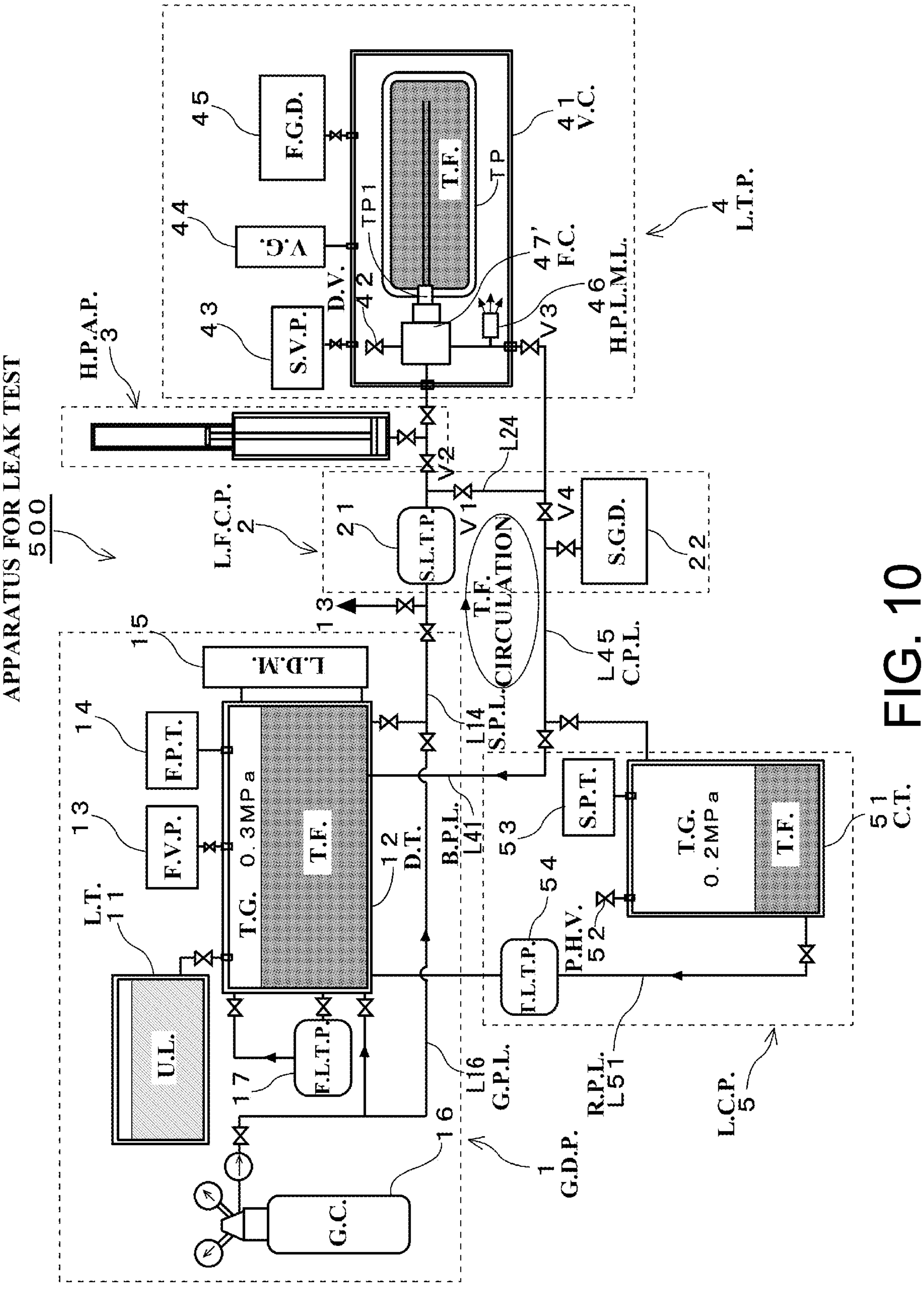
FIG. 10 is an explanatory illustration to show a main part of an apparatus for leak test using a fastener cap for a large volumetric test piece with single port in accordance with the present invention.

FIG. 8 and FIG. 9 are explanatory illustrations to a fastener cap (F.C.) for a large volumetric test piece with single port in accordance with the present invention. FIG. 10 is an explanatory illustration to show a main part of an apparatus 500 for leak test using a fastener cap (F.C.) for a large volumetric test piece with single port in accordance with the present invention.

As shown in FIG. 10, this apparatus 500 for leak test, compared with the aforementioned apparatus 300 for leak test, is provided with: a bypass pipe line (B.P.L.) L24 communicating with both the supply pipe line (S.P.L.) L14 connecting the second liquid transfer pump (S.L.T.P.) 21 of the liquid filling of the circulation portion 2 to the fastener cap (F.C.) 47' of the test piece TP and the collection pipe line (C.P.L.) L45 disposed downstream of the test piece TP; a valve V1 disposed in the middle of the bypass pipe line (B.P.L.) L24; and a valve V4 disposed downstream of the intersection of the bypass pipe line (B.P.L.) L24 and the collection pipe line (C.P.L.) L45. That is, since the high-pressure is applied upstream, the thickness of the pipe line from the high-pressure application portion (H.P.A.P.) 3 to the test piece TP have to be thick, resulting in that inner diameter of the pipe line is small. When the trace fluid is filled by the pipe line with small inner diameter, it takes long time of minutes to fill in the test piece TP of such a large volume as several tens Litter.

And so, by disposing the bypass pipe line (B.P.L.) L24 communicating with both the supply pipe line (S.P.L.) L14 and the collection pipe line (C.P.L.) L45, it is arranged to allow the trace fluid manufactured in the gas dissolution portion (G.D.P.) 1, to be transferred from the collection pipe line (C.P.L.) L45 with relatively large diameter to the test piece TP, resulting in that the filling time of the trace fluid is to become shorten. Each of processes is briefly described below.

[Process Description]

In the liquid filling process, the valve V1, the valve V2, the valve V3, the valve V4 are made open, close, open, close, respectively as well as the port TP1 of the test piece is made open ((a) of FIG. 8), and the trace fluid is filled in the test piece TP drawn a vacuum, from the collection pipe line (C.P.L.) L45.

In the liquid circulating process, when the valve V1, the valve V2, the valve V3, the valve V4 are made close, open, open, open, respectively as well as the port TP1 of the test piece is made open ((b) of FIG. 8), and the trace fluid is filled in the test piece TP from the supply pipe line (S.P.L.) L14 and flown in the collection pipe line (C.P.L.) L45, returned back to the dissolution tank (D.T.) 12 to be circulated.

In the high-pressure application process, when the valve V1, the valve V2, the valve V3, the valve V4 are made all close as well as the port TP1 of the test piece is made close ((a) of FIG. 9), and the trace fluid filled in the test piece TP is to have a high pressure pressurized by utilization of the high-pressure application portion (H.P.A.P.) 3.

In the liquid collecting process, a high-pressure application is relieved. Then, when the valve V1, the valve V2, the valve V3, the valve V4 are made close, open, open, open, respectively as well as the port TP1 of the test piece is made open ((b) of FIG. 9), and the trace fluid filled in the test piece TP is to have a gas pressure of the gas cylinder (G.C.) 16 applied to be flown to the collection tank (C.T.) 51 to be collected.

Figure 11:
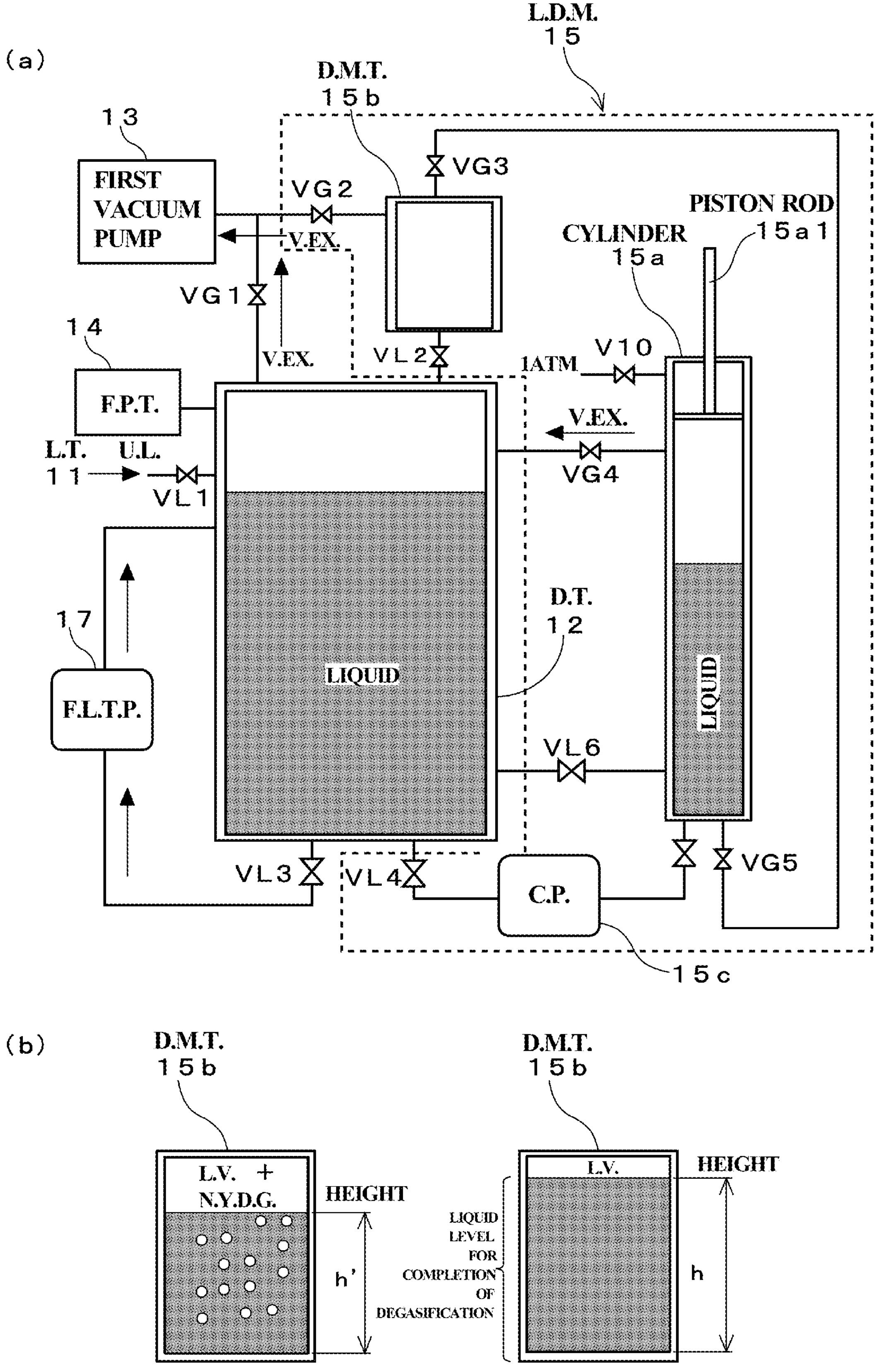
FIG. 11 is an explanatory illustration to show a liquid degasification monitor in accordance with the present invention.

FIG. 11 is an explanatory illustration to show a liquid degasification monitor 15 in accordance with the present invention. In FIG. 11, (a) shows a configuration of the liquid degasification monitor 15 while (b) shows a decision of the completion of degasification.

As shown in (a) of FIG. 11, this liquid degasification monitor (L.D.M.) 15 comprises a cylinder **15*a* to transfer the liquid into the degasification monitor tank (D.M.T.) 15*b*, a degasification monitor tank (D.M.T.) 15*b* for deciding the completion of the degasification, and a circulation pump (C.P.) 15*c* to circulate the liquid between the dissolution tank (D.T.) 12 and the cylinder 15*a***.

The behavior of the liquid degasification monitor (L.D.M.) 15 is briefly described below. First, the unused liquid not yet having completed with degasification is filled in the dissolution tank (D.T.) 12 from the liquid tank (L.T.) 11. Next, it pulls a piston rod **15*al* to fill in the cylinder 15*a*** the filled liquid.

Next, the liquid filled in the cylinder **15*a* is circulated between the dissolution tank (D.T.) 12 and the cylinder 15*a*, by utilization of the circulation pump (C.P.) 15*c*. At the same time, the upper space of the dissolution tank (D.T.) 12, the upper space of the cylinder 15*a*, and the interior of the degasification monitor tank (D.M.T.) 15*b* are drawn a vacuum by utilization of the first vacuum pump (F.V.P.) 13. Subsequently, the degasified liquid is to be transferred into the degasification monitor tank 15*b* being under vacuum condition until a predetermined liquid level, by utilization of the piston rod 15*al* of the cylinder 15*a*. Note that a valve VG2 is to be closed so that the gasification monitor tank 15*b* cannot be drawn a vacuum by the first vacuum pump (F.V.P.) 13 while the liquid is transferred from the cylinder 15*a***.

As shown in (b) of FIG. 11, the liquid level is unchanged same as in filling the liquid if the degasification of the liquid is being completed. On the other hand, if the degasification of the liquid is not yet completed, the liquid level becomes lower because the gas dissolved in the liquid is gasified to increase the volume of the gas. It is the lowering of the liquid level to be monitored.

Figure 12:
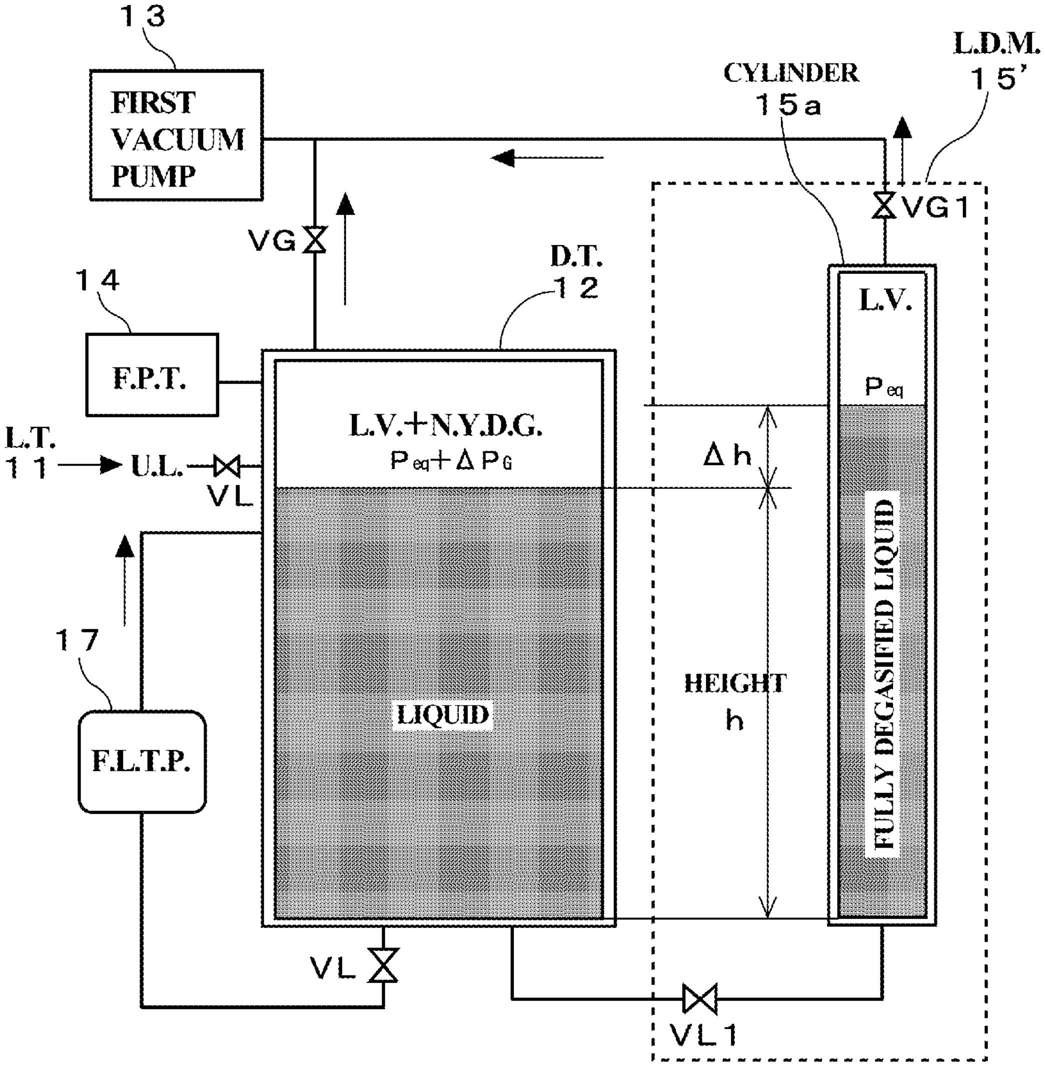
FIG. 12 is an explanatory illustration to show another liquid degasification monitor in accordance with the present invention.

FIG. 12 is an explanatory illustration to show another liquid degasification monitor (L.D.M.) 15' in accordance with the present invention.

This liquid degasification monitor (L.D.M.) 15' comprises a cylinder **15*a*'** for deciding whether or not the degasification of the liquid is completed.

The cylinder **15*a*', is a vacuum degasification monitor means disposed at left side of the dissolution tank (D.T.) 12 in FIG. 12, having a fully degasified liquid, connected to the dissolution tank (D.T.) 12 through a valve VL1. The degasification of the liquid filled in the dissolution tank (D.T.) 12 is conducted when the valve VL1 is closed. After finishing the degasification and opening the valve VL1**, both of heights of the liquid levels become same because each of the space pressures is equal to saturated vapor pressure, if the degasification of the liquid is being completed.

On the other hand, if the degasification of the liquid is not yet completed, the space pressure of the dissolution tank (D.T.) 12 is increased only with $\Delta P_G$ due to gasification of the not yet degasified gas. At this time, the height of the liquid level of the cylinder 15*a*' of the vacuum degasification monitor 15' is increased with $\Delta h = \Delta P_G \rho g$ (ρ: density of the liquid, g: gravity acceleration). The liquid degasification monitor (L.D.M.) 15' monitors the increased height Δh due to this pressure of not yet degasified gas.

What is claimed is:

1. A method for leak testing using, as a trace fluid, a gas dissolved liquid to conduct a leak testing of a test piece, wherein the test piece is placed in a middle of a closed circulated flow path which goes out from a dissolution tank where the gas is dissolved at a given constant concentration, to return back to the dissolution tank through a collection tank which stores the trace fluid flown out of the test piece; and the trace fluid is processed by a degasification process of removing other gases except said gas from the gas dissolved liquid; and wherein the trace fluid is processed by a filling process to flow from the dissolution tank through an interior of the test piece along the closed circulated flow path to be filled in the test piece after the degasification process.

2. The method for leak testing as set forth in claim 1 wherein the test piece is placed in an interior of a vacuum container whose interior can be under vacuum condition.

3. The method for leak testing as set forth in claim 1 wherein the interior of the test piece is put under vacuum condition in advance before being filled with the trace fluid.

4. The method for leak testing as set forth in claim 1 wherein, before being filled with the trace fluid, the interior of the test piece is previously put under non-vacuum condition equal to or less than a gas dissolution pressure which allows the gas to be dissolved in the liquid.

5. The method for leak testing as set forth in claim 1 wherein the test piece filled with the trace fluid is configured to be vibrated, kept still or repressurized by the gas.

6. The method for leak testing as set forth in claim 1 wherein the trace fluid is configured to be returned back to the collection tank in the closed circulated flow path until a given time has passed since the trace fluid got started to be filled in the test piece.

7. The method for leak testing as set forth in claim 6 wherein the trace fluid is, after the given time passed, configured to be filled in the interior of the test piece by being made passed and circulated through the interior of the test piece in the closed circulated flow path.

8. The method for leak testing as set forth in claim 1 wherein, before the test piece is filled with the trace fluid, an upper space over a liquid level of the dissolution tank or the collection tank is drawn in vacuum condition and a degasified liquid is transferred to the interior of the test piece from the dissolution tank or the collection tank.

9. The method for leak testing as set forth in claim 1 wherein a filling line system for filling the trace fluid in the test piece is configured to be independent of a pressurizing line system for pressurizing the filled trace fluid.

10. The method for leak testing as set forth in claim 1 wherein a headspace over a liquid level of the liquid is drawn a vacuum while the liquid stored in the dissolution tank or the collection tank is circulated so that a part of the liquid in the dissolution tank or the collection tank is transferred to a container being under vacuum condition, to determine whether or not the degasification process in the dissolution tank or the collection tank is completed on the basis of a height of the liquid level of the liquid in the container.

11. The method for leak testing as set forth in claim 1 wherein a headspace over a liquid level of the liquid is drawn a vacuum while the liquid stored in the dissolution tank or the collection tank is circulated so that the dissolution tank or the collection tank is communicated with a container storing the liquid completed the degasification process, to determine whether or not the degasification process in the dissolution tank or the collection tank is completed on the basis of a difference of liquid levels between the container and the dissolution tank or the collection tank.

12. The method for leak testing as set forth in claim 1 wherein the liquid is satisfied with a following expression:

[(density of the liquid)×(solubility of the gas to the liquid)]/[(viscosity coefficient of the liquid)×(molecular weight of the liquid)]>(a given coefficient with respect to the gas)×[(density of water)×(solubility of the gas to water)]/[(viscosity coefficient of water)×(molecular weight of water)].

13. The method for leak testing as set forth in claim 1 wherein the gas is carbon dioxide ($CO_2$) or inert gases including helium and argon belonging to the $18^{th}$ group element.

* * * * *